United States Patent
Scheering

(10) Patent No.: US 7,680,903 B2
(45) Date of Patent: *Mar. 16, 2010

(54) METHOD AND ARRANGEMENT FOR CONFIGURING A DEVICE IN A DATA NETWORK

(75) Inventor: Christian Scheering, Bielefeld (DE)

(73) Assignee: Siemens Aktiengesellschaft, Munich (DE)

( * ) Notice: Subject to any disclaimer, the term of this patent is extended or adjusted under 35 U.S.C. 154(b) by 331 days.

This patent is subject to a terminal disclaimer.

(21) Appl. No.: 10/529,405

(22) PCT Filed: Mar. 8, 2004

(86) PCT No.: PCT/EP2004/002365

§ 371 (c)(1),
(2), (4) Date: Mar. 29, 2005

(87) PCT Pub. No.: WO2004/091173

PCT Pub. Date: Oct. 21, 2004

(65) Prior Publication Data

US 2006/0015642 A1 Jan. 19, 2006

(30) Foreign Application Priority Data

Apr. 9, 2003 (DE) ................ 103 16 236

(51) Int. Cl.
*G06F 15/177* (2006.01)
*G06F 15/16* (2006.01)

(52) U.S. Cl. ...................... 709/220; 709/245
(58) Field of Classification Search ........... 709/220, 709/222, 245
See application file for complete search history.

(56) References Cited

U.S. PATENT DOCUMENTS

| 6,049,826 | A | 4/2000 | Beser |
| 6,286,038 | B1* | 9/2001 | Reichmeyer et al. ........ 709/220 |
| 6,345,294 | B1* | 2/2002 | O'Toole et al. ............ 709/222 |
| 6,442,602 | B1* | 8/2002 | Choudhry .................. 709/218 |
| 6,570,849 | B1* | 5/2003 | Skemer et al. ............ 370/230.1 |
| 6,587,874 | B1* | 7/2003 | Golla et al. ................ 709/220 |
| 6,735,692 | B1 | 5/2004 | Murphrey et al. |

(Continued)

FOREIGN PATENT DOCUMENTS

EP    1 079 583 A1    2/2001

(Continued)

OTHER PUBLICATIONS

R. Droms, "Dynamic Host Configuration Protocol", Network Working Group, Oct. 1993, pp. 1-39.

*Primary Examiner*—Nathan Flynn
*Assistant Examiner*—Jeong S Park

(57) ABSTRACT

The invention relates to a method and an arrangement for the configuration of a device in a data network. According to said method, a domain name is first stored in the device. The device then transfers an inquiry message comprising the domain name to an addressing server that serves for the conversion between the domain name and the associated internet addresses. In a further step, the addressing server transmits an address information of a parameter server associated with said device to the device as a response to said inquiry message. The device establishes a link to the parameter server on the basis of said address information. The parameter server transmits via this link parameters to the device which serve to configure the device.

19 Claims, 1 Drawing Sheet

U.S. PATENT DOCUMENTS

2003/0014542 A1* 1/2003 Haug et al. .................. 709/245
2003/0041151 A1  2/2003 Senapati et al.
2005/0002342 A1* 1/2005 Scheering ................... 370/254
2008/0005127 A1* 1/2008 Schneider .................... 707/10

FOREIGN PATENT DOCUMENTS

EP     1 276 275 A2   1/2003
JP     2002 123400    4/2002

* cited by examiner

METHOD AND ARRANGEMENT FOR CONFIGURING A DEVICE IN A DATA NETWORK

CROSS REFERENCE TO RELATED APPLICATIONS

This application is the U.S. National Stage of International Application No. PCT/EP2004/002365, filed Mar. 8, 2004 and claims the benefit thereof. The International Application claims the benefits of German application No. 10316236.4 filed Apr. 9, 2003, both applications are incorporated by reference herein in their entirety.

FIELD OF THE INVENTION

The invention relates to a method for configuring a device in a data network and to an arrangement for configuring a device in a data network.

SUMMARY OF THE INVENTION

In data networks, devices are linked to one another via connections for the purpose of interchanging data with one another. Among the devices, a distinction is drawn between central devices, for example servers, and terminal points, for example PCs. Such terminal points are frequently also called clients. In general, the devices in the data network communicate with one another using associated addresses. If the data interchange in a data network is performed on the basis of the Internet protocol, the addresses used are the "IP (Internet Protocol) addresses".

Many data networks, particularly those with a large number of devices, are structured. This is necessary, for example, in order to reduce the network load in diversely branched networks and to ensure data integrity. For structuring purposes, the data networks are subdivided into logical subregions, which are also called domains. Within a domain, a number of PCs, for example, may be associated with a particular server or with another central device.

The IP addresses used in the data networks comprise a numerical sequence, with each device in a domain and hence also a server, which itself represents a domain, being addressed using a unique IP address. Although such addresses comprising numerical sequences are easy for data processing appliances to handle, this is very abstract for the user of such a device. For this reason, devices, particularly central devices (servers), which represent a domain, can be denoted by an easily understood alphanumeric domain name. A domain name of this type has, for example, the structure HTTP://computer.domain.country. In this example, the address portion "country" denotes the national state in which this server is registered; this address portion "country" is also called the "top level domain" because it represents the coarsest subdivision on the worldwide data network (Internet). The address portion "server" denotes the "subdomain", that is to say a group of devices which are associated with a particular server. Finally, the address portion "name" denotes a single device in the domain in question, that is to say a PC, for example.

To convert the customary domain names, which are input manually by users, for example, on devices (e.g. in the address line of a web browser), into the numerical IP addresses used by the devices themselves, data networks contain-addressing servers, for example domain name system servers (DNS servers). The task of the addressing server is essentially to link the "full qualified domain names" of a device ("host") to its IP address and to deliver the latter upon an external request.

One widely used embodiment of the data networks described is voice data networks, also called VoIP (Voice over Internet Protocol) networks. The voice data networks also contain central devices, for example gateways, gatekeepers and DNS servers, and also terminal points ("clients", "VoIP clients") which may be produced in the voice data networks, for example as a telephone with a data network line ("IP phone"), as a multimedia PC or else as a PC with a telephone emulator ("soft phone"). These terminal points or "clients" are also referred to generally as terminals, in a similar manner to in circuit-switched telephony.

The devices in data networks need to be configured before they are used so that fault-free operation is ensured. For the clients in voice data networks, this means, by way of example, that it is necessary to set these devices for what transmission or compression protocol ("codec") can be used for the voice transmission in the data network or data network element, what central device can be used by the respective terminal, that is to say what gateway is associated with the corresponding appliance, for example, etc. In this case, it is also necessary to configure the IP addresses of the central devices which are to be used in the corresponding terminals so that the terminals can communicate with said central devices.

In the known data networks, it has been found to be a drawback that devices regularly need to be configured manually, and this has a high associated level of personnel involvement. This applies particularly when an existing configuration needs to be changed, for example because a central device in the corresponding data network has a changed network address or when central devices are added to the data network or are removed therefrom. Whenever the association between terminal points and central devices in the data network is changed, this results in the need to change the configuration of the terminal points in real time.

It is known practice for the association between terminal points and central devices (servers) to be updated automatically by virtue of the servers in a data network performing "scanning" at regular intervals of time. The aim of "scanning" is to find terminal points added to the network and to send these terminal points all of the necessary information for configuring them for operation in the data network. In this case, each server sends test messages to each address from a particular address region ("address band") and thus checks whether the corresponding addresses are each associated with terminal points. The terminal points found in this process are then supplied with appropriate information, provided that they have not or not yet been configured correctly, and in this way are set up for operation in the corresponding data network.

It has been found to be a drawback of the "scanning method" that sending a large volume of test messages cyclically results in a high network load, specifically even when only a few terminal points or no terminal points at all have been added to the data network. Terminal points which have been newly added to the data network between two "scanning" processes cannot be used until the next path has concluded. A further drawback of this method is that the address structure in the data network needs to be such that the network addresses of the added terminal points need to match the address bands searched by the corresponding servers, or conversely the address bands need to match the addresses used in the data network.

The object on which the invention is based is thus to specify a method and an arrangement in which the configuration of devices in data networks is simplified.

This object is achieved by the claims.

For the method, the solution is that a domain name is stored in the device, the device transmits a request message, which comprises the domain name, to an addressing server which is used to convert between domain names and the Internet addresses associated therewith, the addressing server transmits to the device, in response to the request message, address information from a parameter server associated with this device, the device uses the address information to set up a connection to the parameter server, and the parameter server uses this connection to transmit to the device parameters which are used to configure the device. This minimizes the manual involvement for configuring the device. In addition, a device is configured in the data network immediately after it is first turned on.

The advantages of the arrangement can be obtained in a similar fashion from the advantages of the method.

Preferred exemplary embodiments of the method and the arrangement are set out in dependent claims, the advantages of the arrangement being the same as the advantages of the corresponding refinements of the method.

The method is particularly advantageous in voice data networks, in which voice information is sent in data packets on the basis of the Internet protocol, because devices need to be configured particularly frequently in voice data networks.

In data networks having a plurality of domains with respective associated parameter servers, a device can be sent to the address of the parameter server which is intended to configure the device if the domain name is the name of that domain which has the device (EG) associated with it.

Existing addressing servers can continue to be used if the addressing server uses data records to store the Internet protocol addresses of the associated servers for the respective names of domains, if the address information from the parameter server associated with the device is stored in a text field which belongs to the data record which belongs to the domain name associated with this device (EG), and if the content of this text field is sent to the device (EG) as the response.

A tried-and-tested addressing server is used if the addressing server used is a domain name system server.

The device can be associated with a parameter server manually if the input from a user or administrator inputs and stores the domain name on the device.

If the DHCP (Dynamic Host Configuration Protocol) method is used to send the device (EG), after it has been started up, the domain name for storage and/or the device (EG) is allocated a valid Internet address then the preconfiguration of the domain name by the manufacturer or an administrator can be stopped and the device can be put into operation without further manual intervention.

If a fictitious domain name which does not belong to a real domain is stored in the device as the domain name, it is also possible to operate devices which are not associated with a real domain.

If not only the fictitious domain name but also a real domain name, which is the domain name with which the device is associated, is stored in the device as domain name, and a first attempt is used to transmit the request message with the real domain name to the addressing server, and if no address information can be ascertained in the addressing server using the domain name transmitted in the first attempt then the addressing server sends a negative acknowledgement message to the device as address information, and the terminal uses a second attempt, following receipt of the negative acknowledgement message, to send a further request message with the fictitious domain name to the addressing server, then the probability of the device being able to send the name of a parameter server is increased.

Exemplary embodiments of the inventive method are explained below with reference to the drawings and are used simultaneously to explain an exemplary embodiment of the inventive arrangement.

DETAILED DESCRIPTION OF THE INVENTION

Figure 1:
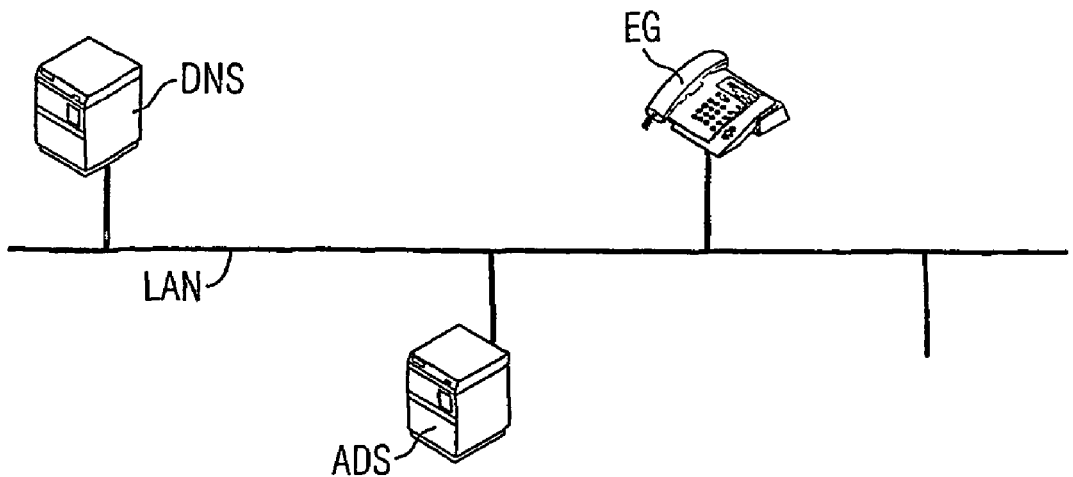
FIG. 1 shows a schematic illustration of a data network having a device, an addressing server and having a parameter server.

FIG. 1 shows a schematic illustration of a data network (LAN) containing, as components, a device (EG), an addressing server (DNS) and a parameter server (ADS=Auto Discovery Server). In principle, it is possible for all components, particularly the device (EG), to have similar components present a plurality of times in the data network (LAN); for reasons of clarity, however, each of the components is shown only once. All components in the data network (LAN) can set up logical connections to other components and can use them to interchange data with one another.

In this example, the data network (LAN) is in the form of a voice data network ("VoIP network") in which voice terminals ("IP phones") transmit voice information as data packets on the basis of the Internet protocol. In this case, the device (EG) used may alternatively be other components (not shown here), for example voice mail servers or PCs; the latter are preferably used as an IP phone using hardware and software. In addition, the voice data network shown in the example contains a gatekeeper and a gateway as central devices, these central devices also not being shown in FIG. 1. In this context, a gatekeeper is used to control the connection setup between terminals (EG), and the gateway is the prerequisite for connections being able to be set up to subscribers which are not arranged in the same data network (LAN).

The addressing server (DNS) used in this case is a domain name system server ("DNS server"). The addressing server (DNS) stores data records in which a respective domain name has the network address ("IP address") of an associated network component (host) associated with it. A distinction is drawn between real domain names, which are associated with existing domains, and fictitious domain names, which have the same structure as real domain names but bear no relation to a real domain. In the case of data records which relate to fictitious domain names, the associated network address is naturally irrelevant in this case.

A data record in the addressing server (DNS) can also be used to store text information in a text field (TXT-RR=Text Resource Record), for example in order to store the name and telephone number of the network administrator who is responsible for the respective network component. In principle, such a text field may also be used to store arbitrary texts with a limited length, however. The content of such a text field can be retrieved by the device (EG) in the network using a request message indicating the domain name of the respective data record. The structure of such text fields is defined for the domain name system server in an RFC (Request For Comment) (RFC1035 in HTTP://ftp.rfc-editor.org/in-notes/rfc1035.txt).

The addressing server (DNS) uses the text fields of particular data records to store address information, that is to say the IP address and the IP port number, from the parameter server (ADS), which information can be used by the device (EG) for the purpose of finding and for setting up connections to the parameter server (ADS). In this case, it does not matter whether the domain names of the data records are real or fictitious domain names; it is more important for the domain name to be used to find the address information from the parameter server (ADS). If the data network (LAN) contains a plurality of devices and parameter servers, storing various domain names in the different devices allows control of the allocation of one of the parameter servers to the respective device.

Figure 2:
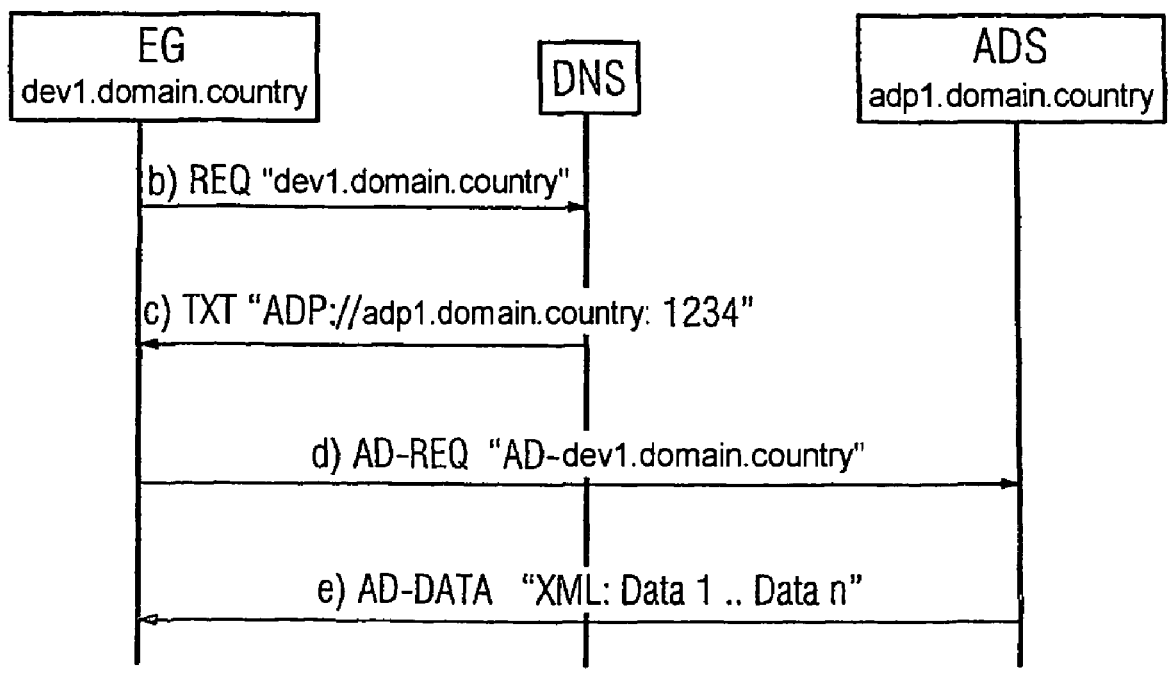
FIG. 2 shows the messages interchanged between the device, the addressing server and the parameter server in chronological order.

The text below explains the fundamental method steps for configuring the device (EG), with FIG. 2 showing those steps which relate to the flow of information between the components shown in FIG. 1 which are the device (EG), the addressing server (DNS) and the parameter server (ADS). This figure shows not only the arrows, which denote the direction of the flow of information, but also the enumerating symbols b).e) for the method steps and symbolized messages.

In a first step, the device (EG) is used to store a domain name. To this end, an administrator inputs a domain name manually on the device (EG) This is the name of that domain with which the device (EG) is associated; in this case, it is: dev1.domain.country.

If the device (EG) is not associated with a real (existing) domain, then a fictitious domain name may also be input at this point. In one particular embodiment, it is also possible to store a plurality of domain names, that is to say a real domain name and a fictitious domain name, for example, in the device (EG).

Another manner of allocation, which is different than the manual method described here, will be explained at a later point.

In the next step (b), the device (EG) sets up a connection to the addressing server (DNS). To this end, the device (EG) needs to store address information (network address, IP address) for the addressing server (DNS). This address information can be stored either manually or automatically, for example using the DHCP (Dynamic Host Configuration Protocol) method; such methods are known generally and are not expounded further here.

In step b), the device (EG) now sends a request message REQ "dev1.domain.country", comprising the stored domain name, to the addressing server (DNS). The addressing server (DNS) now ascertains, in its data base, the data record which corresponds to the domain name which has been sent, and in the next step (c) transfers the information stored in the data record, including the text information which is set out in the text field, to the device (EG) in response. The text information is TXT "ADP://adp1.domain.country:1234" and is constructed such that its structure clearly shows that it is the address information for the parameter server (ADS). In the present example, this address information is constructed either according to the pattern ADP://123.45.67.89:1011 or according to the pattern ADP://host.domain.country:portnumber, the acronym ADP (Auto Discovery Protocol) classifying the configuration service of the parameter server (ADS) which (service) can be reached at this address, and the rest of the address information in numerical (IP address) or alphanumeric (full qualified domain name) form indicating the network address and the IP port number of the configuration service.

In the next step d), the device (EG) extracts the address information from the transmitted text information and stores it. If the address information is in a numerical form (IP address and IP port number), the device (EG) uses the address information to set up a connection to the parameter server (ADS) in a further step (d). If the address information is in the outlined alphanumeric form (full qualified domain name and IP port number), however, it may be necessary for the device (EG) to set up a connection to the addressing server (DNS) again in an intermediate step in order to resolve the alphanumeric address information transmitted into the associated numerical network address.

Following connection setup to the parameter server (ADS), the device (EG) sends a further request message AD-REQ "AD-dev1.domain.country" to the parameter server (ADS). In response to this further request message, the parameter server (ADS) sends information used to configure the device (EG) to the device (EG) in a concluding step (e). In this case, this information is sent in XML (Extensible Markup Language) format, because the network components in customary data networks (LAN) are already equipped for transporting such XML messages. Such a message is in this case constructed according to pattern AD-DATA "XML:Data1 . . . Data n", with the introductory acronym AD-DATA being a mark of configuration data. It goes without saying that the desired information may also be sent in another form, however.

The received information is now used in the device (EG) to perform the required configuration. By way of example, this is the activation of the protocols for voice compression ("voice codecs") which can be used in the respective data network (LAN), and other settings.

The device (EG) may also store a plurality of domain names. Hence, the device (EG) can be provided with a fictitious but generally known domain name by the manufacturer itself, which means that the device (EG) can set up a connection to the addressing server (DNS) after having been started up, without further configuration of a domain name, and in this way receives the address information for setting up the connection to the parameter server (ADS). A prerequisite for this is that the generally known fictitious domain name used is stored in a data record in the addressing server (DNS). A real domain name can be stored in the device (EG) following startup either instead of the fictitious domain name or in addition thereto.

In the latter case, the device (EG) first of all uses the stored real domain name in order to obtain the address information about the parameter server (ADS) from the addressing server (DNS). If the addressing server (DNS) does not store a data record containing this real domain name, however, it responds to the device (EG) with a corresponding error message. The device (EG) now repeats the request message, but this time using the stored fictitious domain name. This two-stage method increases the probability of the device (EG) successfully being provided with the address information about the parameter server (ADS).

The invention claimed is:

1. A method for configuring a device in a data network, the data network comprising an address server, one or more devices requiring configuration, and one or more parameter servers, comprising:

storing a domain name for a device in the device;

storing in an address server on the data network a data record comprising an IP address of a particular parameter server of the one or more parameter servers, wherein the particular parameter server is associated with the domain name;

transmitting a request message from the device to the address server, wherein the request message includes the domain name;

ascertaining by the address server the data record associated with the domain name in the received message;

receiving a response message from the address server by the device, the response message comprising the IP address of the particular parameter server associated with the domain name from the data record;

setting up a connection to the particular parameter server by the device, the device using the IP address of the particular parameter server extracted from the response message to set up the connection;

receiving parameters by the device from the particular parameter server, wherein the parameters are used to configure the device; and wherein both a fictitious domain name and a real domain name are stored in the device and wherein the device first transmits in the request message the real domain name to the address server and if, in response, the device receives a negative acknowledgement because no data record was associated with the real domain name, the device thereafter sends in the request message the fictitious domain name, thereby increasing the probability that the IP address of a particular parameter server will be sent to the device.

2. The method as claimed in patent claim 1, wherein the data network is a voice data network in which voice information is sent in data packets on the basis of Internet protocol.

3. The method as claimed in patent claim 1, wherein the IP address of a particular parameter server is stored in a domain name system server as the address server in a text field of the data record associated to the domain name, and wherein the text field is sent to the device in the response.

4. The method as claimed in patent claim 1, wherein the stored domain name is a fully-qualified domain name.

5. The method as claimed in patent claim 1, wherein the domain name is a fictitious domain name which does not belong to a real domain.

6. The method as claimed in patent claim 5, wherein both a real domain name and a fictitious domain name are stored in the device.

7. The method as claimed in patent claim 1 wherein a fictitious domain name comprising the generally known domain name of the device is stored by the manufacturer in the device and wherein the fictitious domain name is also stored in the address server and associated with a particular parameter server.

8. The method of claim 7 wherein a real domain name is stored in the device in addition to the fictitious domain name, and wherein the device first transmits in the request message the real domain name to the address server and if, in response, the device receives a negative acknowledgement because no data record was associated with the real domain name, the device thereafter sends in the request message the fictitious domain name, thereby increasing the probability that the IP address of a particular parameter server will be sent to the device.

9. A method for configuring a device in a data network, the data network comprising an address server, one or more devices requiring configuration, and one or more parameter servers, the method comprising:

storing a domain name for a device in the device, the stored domain name is a fictitious domain name which does not belong to a real domain;

storing in the device a real domain name with which the device is associated;

storing in an address server on the data network a data record comprising an IP address of a particular parameter server of the one or more parameter servers, wherein the particular parameter server is associated with the domain name;

transmitting a first request message to the addressing server by the device, the first request message comprising the domain name;

ascertaining by the address server the data record associated with the domain name in the received message;

transmitting the IP address of the particular parameter server to the device by the addressing server in response to a receipt of the first request message, wherein the device uses the IP address to set up a connection to the particular parameter server, and wherein the particular parameter server uses this connection to transmit to the device parameters which are used to configure the device, prior to transmitting the first request message:

transmitting a second request message to the addressing server, the second request message comprising the real domain name; and receiving a negative acknowledgement by the device from the addressing server when address information for the parameter server cannot be ascertained in the domain name system server based on the real domain name transmitted in the second request message, wherein the transmission of the first request message with the fictitious domain name to the addressing server is in response to the receipt of the negative acknowledgement message.

10. The method as claimed in patent claim 9, wherein the IP address related to the particular parameter server associated with the device is stored in a text field which belongs to the data record which belongs to the domain name associated with this device, and wherein the text field is sent to the device as the response.

11. The method as claimed in patent claim 9, wherein the domain name is entered and stored in the device by a user or an administrator.

12. The method as claimed in patent claim 9, wherein the real domain name is a fully-qualified domain name.

13. The method as claimed in patent claim 9, wherein the stored domain name is a fully-qualified domain name.

14. An arrangement for configuring a device in a data network, the data network comprising an address server, one or more devices requiring configuration, and one or more parameter servers, the device having a memory, the arrangement comprising:

an addressing server for converting between a domain name of a device and an Internet protocol (IP) address of a particular parameter server comprising the parameters to configure the device;

wherein the device, the addressing server, and the parameter server are connected via the data network, wherein the device is designed to:

store a fictitious domain name and a real domain name, the fictitious domain name is a fully-qualified domain name, the real domain name is associated with the device, transmitting a first request message to the addressing server, the first request message comprising the real domain name;

receiving a negative acknowledgement from the addressing server when address information cannot be ascertained, by the address server, for the real domain name transmitted, and transmit, after receiving the negative acknowledgement, a second request message to the addressing server, said second request message comprising the fictitious domain name stored in the device, wherein the addressing server is designed to:
  use the domain name transmitted by the device to look up a text field associated with the transmitted domain name, the text field having address information of the particular parameter server, the address information including a port number,
  form a response message comprising the looked address information of the particular parameter server assigned to the device, the response being a negative acknowledgement when the address information cannot be ascertained, the response message transmitted to the device in response to the request message,
wherein the device is further designed to connect to the particular parameter server based on the response message, and
wherein the particular parameter server is adapted to send parameters to the device.

15. The arrangement as claimed in patent claim 14, wherein the data network is a voice data network in which voice information is sent in data packets on the basis of an Internet protocol.

16. The arrangement as claimed in patent claim 14, wherein the addressing server is a domain name system server.

17. The arrangement as claimed in patent claim 16, further comprising:
  a DHCP server connected to the device via the data network and designed to send the domain name to the device using a DHCP method after said device has been started up, the domain name being that domain name which is used by the device in the request message.

18. The arrangement as claimed in patent claim 17, wherein the device is assigned to a domain in the data network, and the domain name sent in the request message is a name of this domain.

19. The arrangement as claimed in patent claim 14, wherein in the addressing server is stored the data record with a fictitious domain name which does not belong to a real domain, and wherein the fictitious domain name is simultaneously stored as domain name in the memory of devices in which no domain name for the real domain associated therewith is stored.

* * * * *